(12) United States Patent
Morken

(10) Patent No.: US 7,767,282 B2
(45) Date of Patent: *Aug. 3, 2010

(54) COPOLYMERS OF VINYL ALCOHOL AND ITACONIC ACID AND USES THEREOF

(75) Inventor: Peter A. Morken, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 483 days.

This patent is subject to a terminal disclaimer.

(21) Appl. No.: 11/199,881

(22) Filed: Aug. 9, 2005

(65) Prior Publication Data

US 2006/0035042 A1 Feb. 16, 2006

Related U.S. Application Data

(60) Provisional application No. 60/600,483, filed on Aug. 10, 2004.

(51) Int. Cl.
*B65D 1/00* (2006.01)
*D21H 19/60* (2006.01)
*C09D 131/04* (2006.01)

(52) U.S. Cl. ............... 428/35.2; 53/474; 526/318.3; 526/318.4; 526/318.44; 526/329.5; 524/557; 524/561; 524/564

(58) Field of Classification Search ............... 510/295, 510/439, 296, 220, 221; 8/137; 428/35.2, 428/34.1, 34.8, 203, 423.1; 156/243; 430/130; 427/372.2; 525/57; 524/557, 503, 561; 624/564
See application file for complete search history.

(56) References Cited

U.S. PATENT DOCUMENTS

| 4,747,976 | A | * | 5/1988 | Yang et al. ............... 510/439 |
|---|---|---|---|---|
| 4,885,105 | A | | 12/1989 | Yang et al. |
| 5,057,570 | A | | 10/1991 | Miller et al. |
| 5,527,852 | A | | 6/1996 | Maruyama et al. |
| 5,712,334 | A | * | 1/1998 | Watanabe et al. ............ 524/161 |
| 7,022,656 | B2 | * | 4/2006 | Verrall et al. ............... 510/293 |
| 7,371,796 | B2 | | 5/2008 | Echt et al. |
| 2005/0154120 | A1 | * | 7/2005 | Echt et al. .................... 524/503 |
| 2008/0171825 | A1 | | 7/2008 | Echt et al. |
| 2008/0176993 | A1 | | 7/2008 | Echt et al. |
| 2008/0176998 | A1 | | 7/2008 | Echt et al. |

FOREIGN PATENT DOCUMENTS

| EP | 0 291 198 A2 | 11/1988 |
|---|---|---|
| EP | 0461635 A1 | 12/1991 |
| EP | 0587114 B1 | 3/1994 |
| GB | 1143974 A | 2/1969 |
| GB | 2109704 A | 6/1983 |
| JP | 57117697 A | 7/1982 |
| JP | 03027198 | 2/1991 |
| JP | 03234754 A | 10/1991 |
| JP | 8003221 A | 1/1996 |
| JP | 3228564 B2 | 11/2001 |
| WO | WO 94/04656 | 3/1994 |
| WO | WO 2004/085600 A1 | 10/2004 |
| WO | WO 2005/059248 A1 | 6/2005 |

OTHER PUBLICATIONS

C. A. Finch, "Chemical Reactions and Stereochemistry of Polyvinyl Alcohol", Polyvinyl Alcohol, pp. 269-312, John Wiley & Sons Ltd., 1992.
R.K. Tubbs, "Polyvinyl Alcohol Acrylate and Methacrylate Copolymers and Their Applications in Textile Sizing and Films", Polyvinyl Alcohol, pp. 361-402, John Wiley & Sons Ltd., 1992.
Moritani et al., "Functional modification of poly(vinyl alcohol) by copolymerization: II. Modification with a sulfonate monomer", Polymer, vol. 39 No. 3, pp. 553-557.

* cited by examiner

*Primary Examiner*—Rena L Dye
*Assistant Examiner*—Ellen S Wood

(57) ABSTRACT

The present invention is a film that is soluble in cold water, and useful in such applications as detergent sachets. Films of the present invention are PVOH copolymers that comprise itaconic acid.

5 Claims, No Drawings

COPOLYMERS OF VINYL ALCOHOL AND ITACONIC ACID AND USES THEREOF

This application claims the benefit of U.S. Provisional Application No. 60/600,483, filed Aug. 10, 2004.

BACKGROUND OF THE INVENTION

1. Field of the Invention

This invention relates to uses of polyvinyl alcohol copolymers.

2. Description of the Prior Art

There is a consumer need for water-soluble packaging, which offers the consumer convenience and can reduce packaging waste persistent in the environment when the packaging material is ultimately degraded by microorganisms at sewage treatment plants. This convenience to the consumer can also include the benefit of unit-dose packaging, which does not require measurement or handling of package contents. It can be particularly attractive to package laundry detergent in such a manner, and in fact such packaging is in use today to deliver liquid laundry detergent and automatic dishwasher cleaning agents.

Water-soluble packaging material commonly used for liquid laundry detergent is often based on polyvinyl alcohol (PVOH) films. PVOH is manufactured commercially by polymerization of vinyl acetate monomer (VAM) to afford polyvinyl acetate (PVAc). The PVAc is then transesterified—in most commercial processes with methanol—to afford PVOH and methyl acetate. PVOH that is >98% hydrolyzed (that is, less than 2% residual vinyl acetate) is unacceptable for this application because it does not dissolve at practical temperatures, usually requiring temperatures in excess of 50° C. to dissolve. This temperature is inconvenient for consumers. Of greater utility to consumers are packaging materials that dissolve in cold water, that is, water at a temperature of from 10-25° C. This can be accomplished by modifying PVOH to reduce crystallinity and/or increase hydrophilicity of the polymer. The crystallinity of the polymer is conveniently and conventionally reduced by carrying out the transesterification of PVAc in such a manner as to not complete the conversion to PVOH and obtain a product that is conventionally known as partially hydrolyzed PVOH (phPVOH). Commercial grades of phPVOH include Celvol 523 from Celanese Chemicals and Kuraray POVAL PVA 217 sold by Kuraray Co., Ltd. The degree of conversion (loosely referred in the industry as "hydrolysis") in most cases varies from 78-99.8%, and 88% hydrolyzed is an especially common grade for water soluble packaging. Post-polymerization or post-copolymerization modifications of PVOH can reduce crystallinity. Adding polar groups to the polymer can increase the hydrophilicity of the polymer. This can be accomplished by post-polymerization reaction or by copolymerization method. Post polymerization reactions have been reviewed (*Polyvinyl Alcohol-Developments*; Finch, C. A., Ed.; John Wiley & Sons: New York, 1992). One known copolymerization method to increase hydrophilicity is to copolymerize VAM with an acid-containing monomer such as acrylic acid or others as described in U.S. Pat. No. 4,885,105. After transesterification of such a copolymer a hydrophilic carboxylic acid or carboxylic acid salt remains. Inclusion of up to 10 mol % comonomer can modify the film solubility adequately to satisfy consumers. A cold water soluble film can be obtained by copolymerization of VAM with a monomer that later undergoes a chemical reaction to render it hydrophilic. For example, VAM/methyl acrylate (MA) copolymer is known to undergo transesterification reaction to a PVOH copolymer where the MA carboxyl group has formed a lactone structure with a neighboring alcohol unit (*Polyvinyl Alcohol-Developments*; Finch, C. A., Ed.; John Wiley & Sons: New York, 1992). This lactone-containing polymer is not soluble in cold water. However, after treatment with alkali such as sodium hydroxide the lactone is converted to the ring-opened, sodium carboxylate form which is cold water soluble.

In order to be practical and useful, the films should be compatible with the chemicals they contain, at least for enough time that premature rupture of the package does not occur. For example, a film made from phPVOH is sensitive to high or low pH chemicals, as they cause hydrolysis of the residual vinyl acetate, effecting change to cold-water insoluble PVOH.

PVOH copolymers from monomers containing carboxylate or carboxylate precursor groups are stable to high pH. However at lower pH the carboxylic acid can undergo ion-exchange with protons in the film's encapsulate. If the number of carbon atoms separating the carboxylate carbon and oxygen atom of a neighboring alcohol group is equal to three, then the groups can undergo lactonization to afford the water-insoluble lactone-containing copolymer. This package then does not completely dissolve, leading to consumer dissatisfaction. The pH where lactonization reaction begins to occur is about <8, depending on the concentration of the ions in the encapsulate.

It has been found that a copolymer that includes itaconic acid (IA), which is convenient to manufacture due to its high conversion during polymerization, can be a useful carboxylate copolymer. WO 94/04656 describes use of 2-8 mol % IA copolymer in water soluble packaging application. This copolymer retains cold water solubility to a better extent than a methyl acrylate copolymer that has been converted to sodium carboxylate form by caustic. For example, a film using greater than or equal to 4 mol % IA gave good solubility stability after prolonged contact with Ariel liquid laundry detergent. However a film with 2.8% IA had inadequate solubility stability, surprising in view of the fact that WO 94/04656 teaches that 2-8 mol % IA copolymer has desirable solubility properties. However, the IA monomer has some disadvantages. It is a higher cost monomer than VAM. Also most commercial transesterification processes utilize a basic catalyst. The IA in the copolymer is neutralized in an acid-base reaction with the basic catalyst, which adds cost to the process. The increased catalyst demand can also exceed the feeding capability of existing facilities, necessitating costly modifications. Thus it can be desirable to manufacture an IA copolymer having good cold water solubility with the lowest possible IA content.

SUMMARY OF THE INVENTION

In one aspect the present invention is a film useful as a cold-water soluble detergent sachet comprising a terpolymer composition comprising vinyl alcohol, methyl acrylate, and itaconic acid moieties, wherein: (i) the terpolymer comprises less than about 5 mol % of vinyl acetate moieties; (ii) the methyl acrylate is present in an amount of at least about 1 mol % up to about 9 mol %; (iii) the itaconic acid is present in an amount of at least about 1 mol % up to about 9 mol %, and, (iv) the methyl acrylate is in the form of a lactone.

DETAILED DESCRIPTION OF THE INVENTION

PVA copolymers of the present invention can be obtained by known and conventional methods. PVA copolymers are typically obtained by copolymerization of vinyl acetate and other comonomers, followed by hydrolysis of the vinyl acetate copolymer to the vinyl alcohol copolymer. As used herein, the term complete hydrolysis, or 100% hydrolysis, shall be taken to mean that a stoichiometrically sufficient amount of reagent has been added to hydrolyze 100 mol % of the acetate groups of a polyvinyl acetate. A PVA copolymer of the present invention can comprise some residual un-hydrolyzed acetate moieties. Preferably a PVA copolymer of the present invention comprises less than about 5 mol % residual acetate moieties, more preferably less than about 3 mol %, most preferably less than about 2 mol %.

The PVA/acid copolymer of the present invention comprises from at least about 1 mol % to about 10 mol % itaconic acid (IA). Preferably the PVA acid copolymer comprises from about 1 to about 9 mol % itaconic acid, more preferably from about 1 to about 5 mol %, and most preferably from about 1 to about 3 mol % itaconic acid. In a particularly preferred embodiment, the itaconic acid is present in an amount of at least about 2 mol %.

The degree of polymerization of the PVA acid copolymer is from about 400 to about 4000. Preferably the degree of polymerization of the PVA copolymer is from about 500 to about 2000.

In another embodiment, the PVA acid copolymer of the present invention is a terpolymer comprising vinyl alcohol and itaconic acid constituents, and additionally comprising a second acid polymer constituent that is either an acrylic or a methyl acrylate unit. A PVA mixed acid terpolymer of the present invention can be preferred in some cases.

In still another embodiment, the present invention is a polyvinyl alcohol terpolymer composition wherein the terpolymer comprises vinyl alcohol, methyl acrylate, and itaconic acid moieties, wherein the vinyl alcohol is present in an amount of at least about 90 mol %. Preferably the vinyl alcohol is present in an amount of at least about 92 mol %, and most preferably at least about 94 mol %.

Of the remaining terpolymer, itaconic acid is present in an amount of from at least about 1.0 mol % up to about 9 mol %, and methyl acrylate is present in an amount of from at least about 1 mol % up to about 9 mol %.

It can be desirable to reduce the IA content of the copolymer, for cost reasons, to a level of less than about 2.8% by incorporating more of the methyl acrylate. Incorporating functional equivalents of MA or IA is also contemplated as within the scope of the present invention. For example, alkyl (meth)acrylates such as methylmethacrylate, butyl acrylate, or ethyl (meth)acrylate (wherein "(meth)acrylate" is shorthand for either a methacrylate or an acrylate) are considered functional equivalents of methyl acrylate.

A film can be prepared from a composition of the present invention by conventional methods known to one of ordinary skill in the art. For example, a film can be prepared as a cast film. Other methods of preparing a film from the composition described herein would be known to one of ordinary skill in the art.

A film comprising the terpolymer composition described herein is soluble in a cold aqueous solution at a temperature of less than or equal to about 25° C. Preferably the film is soluble in water that is at a temperature of from about 10° C. to about 25° C. The terpolymer comprises methyl acrylate that essentially exists in the lactone form rather than in the acid or carboxylate form.

The cold-water solubility of a film described herein can be useful in practical applications such as for detergent sachets or pouches that dissolve in cold water to allow the detergent contents to mix with the water, without leaving an insoluble polymer residue from the package. A cold-water soluble pouch of the present invention can also be used to contain other cleaning chemicals, insecticides, herbicides, and similar materials, with the caveat that the contents of the pouch should be compatible or otherwise not readily degrade or react with the pouch composition.

EXAMPLES

The Examples are for illustrative purposes only, and are not intended to limit the scope of the invention.

Examples 1-4

A 2 L polymer kettle was assembled with an overhead stirrer, a Claisen head with a multi-inlet port fitting connected to 2 syringe pumps and a tap-$H_2O$ condenser further attached to a $N_2$ bubbler, an overhead thermowell with a thermocouple device, and a septum. The agitator was a single PTFE paddle and the stir rate was set to 80 rpm. The kettle was charged with 1000 g vinyl acetate (Aldrich Chemical co., Milwaukee, Wis., USA) 401 g MeOH (EM Science), 1.5 g itaconic acid (Aldrich), and 0.6 g methyl acrylate (Aldrich) then degassed at rt for 20 minutes with a sparging tube. The kettle was then heated to reflux (ca. 65° C.) with an oil bath. Syringe pump #1 was charged with neat methyl acrylate. Syringe pump #2 was charged with a 24.7 wt % solution of itaconic acid in MeOH. 2 g of VAZO-64 (DuPont, Wilmington, Del., USA) dissolved in 100 g of MeOH was added to the reactor. Syringe pump #1 was then activated to feed at 0.0262 cc/min and syringe pump #2 was activated to feed at 0.46 cc/min. The polymerization was refluxed for 159 minutes, then a solution of sodium nitrite (Aldrich) in 80 g of MeOH was added all at once to halt the polymerization. The solids were determined to be 17.8% at this time. The polymer is thus 4.1 mol % itaconic acid and 1.6 mol % methyl acrylate. The polyvinyl acetate terpolymer was transferred to a 3 L round bottom flask. The flask was attached to a rotary evaporator and MeOH/vinyl acetate azeotrope was removed at reduced pressure. Addition of 500 g of MeOH followed by azeotropic distillation was repeated 3 times, at which time removal of vinyl acetate was judged substantially complete. The polyvinyl acetate was dissolved in 700 g of MeOH and charged to a 1 gallon explosion-proof stainless steel blender (Eberbach Corp., Ann Arbor, Mich.). The blender was set to stir at 10,000 rpm then 430 g of 25 wt % sodium methoxide in methanol (Aldrich) was added through a small hole in the blender's cover. The ensuing heterogeneous mixture was stirred for 10 minutes, then 143 g of glacial acetic acid (EM Science) was slowly added. The mixture was stirred 2 minutes, then filtered. The polymer product was rinsed 3 times with MeOH and once with acetone, then dried in a vacuum oven at 80° C. overnight. 151 g of white terpolymer powder were isolated. The viscosity was determined to be 21.8 mPa-s (cP) (4% solids aqueous solution at 20° C. (68° F.), determined by Hoeppler falling ball method). Infrared analysis in ATR mode of the polymer showed the presence of a lactone carbonyl peak at 1745 $cm^{-1}$, an acid carboxyl at 1705 $cm^{-1}$, and a sodium carboxylate at 1572 $cm^{-1}$. Examples 5-9 were prepared in the same manner, except that the polymerization time was 175 minutes and the precharge and feed rates of itaconic acid (IA) and methyl acrylate (MA) were modified as shown in Table 1.

Examples 5-9

TABLE 1

| Ex No. | IA Precharge (g) | MA Precharge (g) | MeOH Precharge (g) | Pump 1 (cc/min.) | Pump 2 (cc/min.) | IA mol % | MA mol % |
|---|---|---|---|---|---|---|---|
| 5 | 1.24 | 0.72 | 400 | 0.0314 | 0.368 | 2.3 | 1.4 |
| 6 | 1.51 | 0.83 | 400 | 0.0380 | 0.442 | 2.8 | 1.7 |
| 7 | 1.49 | 1.47 | 400 | 0.064 | 0.442 | 3.0 | 3.0 |
| 8 | 1.00 | 2.50 | 400 | 0.11 | 0.300 | 2.1 | 5.4 |
| 9 | 1.40 | 1.48 | 420 | 0.066 | 0.425 | 2.7 | 2.9 |

Comparative Examples

Itaconic acid copolymers were prepared by the same method, with the exception that only one syringe pump was utilized.

| Example | IA Precharge (g) | MeOH Precharge (g) | IA Pump (cc/min.) | IA mol % |
|---|---|---|---|---|
| Comparative Example 1 | 2.4 | 400 | 0.49 | 4.0 |
| Comparative Example 2 | 2.0 | 400 | 0.46 | 2.8 |

Film Fabrication and Testing:

Polymers were dissolved to 13% solids in 80° C. $H_2O$. Plasticizers, surfactants, antiblock agents, and other components were added. Carbowax™ polyethylene glycol 200 (Union Carbide, Danbury, Conn.) was also added. The final compositions excluding $H_2O$ contained polymer, additive package, and polyethylene glycol in a ratio of 65:33.7:1.3. The solution was cooled to room temperature, and a film was cast on a glass plate using an 8" wide knife with a 10 mil gate (Gardner Laboratory, Silver Spring, Md., USA). The film was allowed to dry at room temperature overnight. A 14 oz round, plastic container with diameter of 5" was charged with 100 mL of Ariel Essential liquid laundry detergent (Proctor & Gamble Co.; pH of the neat detergent was 7.3 and of the aqueous (tap water) 5 wt % solution was 7.9). A 3 mil film of the previous example with a diameter ca. 0.5" greater than the diameter of the container was placed on top of the container, then the lid was attached to the container, thus forming a seal. The container was then inverted and placed in a 38° C. oven for accelerated aging. Samples were removed periodically, and the time for an 8 $cm^2$ piece of film to dissolve in 500 mL of stirred, room temperature water was determined.

| Example | IA mol % | MA mol % | Dissolution Time 0 weeks aging (sec.) | Dissolution Time 4 weeks aging (sec.) |
|---|---|---|---|---|
| 5 | 2.3 | 1.4 | 83 | 205 |
| 6 | 2.8 | 1.7 | 50 | 120 |
| 7 | 3.0 | 3.0 | 44 | 107 |
| 8 | 2.1 | 5.4 | 71 | 123 |
| 9 | 2.7 | 2.9 | 57 | 121 |
| Comparative Example 1 | 4.0 | 0 | 54 | 128 |
| Comparative Example 2 | 2.8 | 0 | 110 | 156 |

As can be seen in the table, lower dissolution times than 4.0 mol % IA (Comparative Example 1) can be achieved with less IA provided MA termonomer is incorporated.

What is claimed is:

1. A sachet or pouch comprising a film that is soluble in cold water wherein the film comprises a hydrolyzed lactonized vinyl acetate terpolymer composition comprising less than about 5 mol % unhydrolyzed vinyl acetate moieties wherein the hydrolyzed lactonized terpolymer is formed by hydrolysis of a terpolymer of vinyl acetate, alkyl acrylate and itaconic acid, said hydrolyzed lactonized vinyl acetate terpolymer comprising vinyl alcohol moieties formed by hydrolysis of the vinyl acetate moieties and lactone moieties formed by transesterification of the alkyl acrylate moieties present in the terpolymer of vinyl acetate, alkyl acrylate and itaconic acid with vinyl alcohol moieties formed by hydrolysis of the vinyl acetate moieties, and further wherein: (i) the alkyl acrylate is present in the terpolymer of vinyl acetate, alkyl acrylate and itaconic acid in an amount of at least about 1 mol % up to about 9 mol %; and (ii) the itaconic acid is present in the terpolymer of vinyl acetate, alkyl acrylate and itaconic acid in an amount of at least about 1 mol % up to about 10 mol %.

2. A pouch of claim 1 wherein the pouch contains detergent.

3. The pouch of claim 2 wherein the detergent is a liquid.

4. A process for dispersing detergent in cold water comprising the steps: (1) dispensing detergent into a pouch comprising a film that is soluble in cold water comprising a hydrolyzed lactonized vinyl acetate terpolymer composition comprising less than about 5 mol % unhydrolyzed vinyl acetate moieties wherein the hydrolyzed lactonized terpolymer is formed by hydrolysis of a terpolymer of vinyl acetate, alkyl acrylate and itaconic acid, said hydrolyzed lactonized vinyl acetate terpolymer comprising vinyl alcohol moieties formed by hydrolysis of the vinyl acetate moieties and lactone moieties formed by transesterification of the alkyl acrylate moieties present in the terpolymer of vinyl acetate, alkyl acrylate and itaconic acid with vinyl alcohol moieties formed by hydrolysis of the vinyl acetate moieties, and further wherein: (i) the alkyl acrylate is present in the terpolymer of vinyl acetate, alkyl acrylate and itaconic acid in an amount of at least about 1 mol % up to about 9 mol %; and (ii) the itaconic acid is present in the terpolymer in an amount of at least about 1 mol % up to about 10 mol %; and (2) placing the pouch in contact with water at a temperature of less than or equal to about 25° C.

5. A sachet or pouch of claim 1 wherein the alkyl acrylate is methyl acrylate.

* * * * *